(12) United States Patent
Verschaeve et al.

(10) Patent No.: US 11,010,930 B2
(45) Date of Patent: May 18, 2021

(54) INDEXATION OF MASSIVE POINT CLOUD DATA FOR EFFICIENT VISUALIZATION

(71) Applicant: MY VIRTUAL REALITY SOFTWARE AS, Oslo (NO)

(72) Inventors: Joris Constant Gaston Verschaeve, Oslo (NO); Roy Morten Brenna, Porsgrunn (NO); Jørgen Lind, Bekkestua (NO); Rasmus Bording, Oslo (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 41 days.

(21) Appl. No.: 16/435,150

(22) Filed: Jun. 7, 2019

(65) Prior Publication Data

US 2020/0027248 A1    Jan. 23, 2020

(30) Foreign Application Priority Data

Jun. 8, 2018    (EP) .................................... 18176796

(51) Int. Cl.
   *G06T 9/40*    (2006.01)
   *G06T 7/521*   (2017.01)
   *G01S 17/89*   (2020.01)
   *G06F 7/24*    (2006.01)
   *G06T 17/00*   (2006.01)
   *G06T 5/40*    (2006.01)

(52) U.S. Cl.
   CPC ............... *G06T 9/40* (2013.01); *G01S 17/89* (2013.01); *G06F 7/24* (2013.01); *G06T 5/40* (2013.01); *G06T 7/521* (2017.01); *G06T 17/005* (2013.01)

(58) Field of Classification Search
   CPC .. G06T 9/40; G06T 7/521; G06T 5/40; G06T 17/005; G06T 17/00; G01S 17/89; G06F 7/24; G06F 16/2246
   See application file for complete search history.

(56) References Cited

U.S. PATENT DOCUMENTS

| | | | |
|---|---|---|---|
| 2012/0313944 A1* | 12/2012 | Kontkanen | ........... G06T 17/005 345/426 |
| 2019/0080483 A1* | 3/2019 | Mammou | ................. G06T 9/40 |
| 2019/0236403 A1* | 8/2019 | Lilley | .................. G06K 9/6211 |

FOREIGN PATENT DOCUMENTS

EP    2 533 213 A2    12/2012

OTHER PUBLICATIONS

Pavlovic et al. "Dictionary Compression in Point Cloud Data Management." SIGSPATIAL '17, Proceedings of the 25th ACM SIGSPATIAL International Conference on Advances in Geographic Information Systems, article No. 45, Nov. 7, 2017, pp. 1-10 (Year: 2017).*

(Continued)

*Primary Examiner* — Jon Chang
(74) *Attorney, Agent, or Firm* — Maschoff Brennan (57) ABSTRACT

A method for pre-processing point clouds comprising large amounts of point data. The method comprises converting the points' coordinates to Morton indices, sorting the Morton indices and sequentially determining intervals based on predefined criteria, which intervals define the leaf nodes and form the basis and starting point for the generation of a tree index structure comprising the leaf nodes, nodes, branches and nodes connecting the branches. Point data contained within a node or sub-trees of a node are quantizable.

19 Claims, 6 Drawing Sheets

(56) References Cited

OTHER PUBLICATIONS

Anh-Vu, V., et al., "Lessons Learned with Laser Scanning Point Cloud Management in Hadoop HBase", Proc. Int. Conf. Adv. Biometrics, pp. 231-253 (May 19, 2018).
Pavez, E., et al., "Dynamic polygon cloud compression", 2017 IEEE International Conference On Acoustics, Speech And Signal Processing, pp. 2936-2940 (Mar. 1, 2017).
Wahl, E, et al., "A Method for Fast Search of Variable Regions on Dynamic 3D Point Clouds", Pattern Recognition Lecture Notes In Computer Science, pp. 208-215 (Jan. 1, 2005).
European Search Report dated Mar. 22, 2019 as received in Application No. 18 17 6796.3.

* cited by examiner

```
Function: leafNodeGeneration()
Input:
    • m[0..N-1] : array of sorted Morton indices
    • a : lower bound of the initial interval containing m,
      for example a = 0
    • b : upper bound of the initial interval containing m,
      for example b = ~0
    • Np : maximum number of points contained in leaf node
Output:
    • l[0..Nl-1] : array of sorted leaf nodes, where each
      leaf node is characterized by its interval boundaries
      a_i, b_i and the points contained inside.

Set i = 0
Set k = 0
While ( i < N ) {
    Set p = m[i+Np]
    If ( p < b ) {
        Set b = computeNewUpperBound(a,p)
    }
    Set j = i;
    increment j such that p[j+1] >= b and p[j] < b either by
    binary search or linear incrementation.
    Set l[k] = (a,b,m[i..j])
    Set a = b
    Set b = computeUpperBound(a)
    Set i = j+1
    Set k = k+1
}
return l
```

```
Function: computeNewUpperBound()
Input:
    • a : lower bound of the interval
    • p : the Npth point past a
Output :
    • b : new upper bound of the interval Set c to the largest power of two, bounding a^p from below
(where ^ is the bitwise exclusive or operation; ^ can also be
replace by - (subtraction operation) )
Set b = a | c (where | is the bitwise or operation; | can
also be replace by + (addition operation) )
return b
```

```
Function: computeUpperBound()
Input:
    • a : lower bound of the nextinterval
Output:
    • b : upper bound for the next interval Set c to the smallest fraction contained in a which is a
power of two.
Set b = a | c (where | is the bitwise or operation; | can
also be replaced by + (addition operation) )
return b
```

Fig. 6

```
Pseudocode for the sequential scan with predefined lod level
L:

Function leafNodeGeneration()
Input:
- m[0..N-1] : array of sorted Morton indices
- L : lod level at which the leaf nodes should be generated
Output:
- l[0..Nl-1] : array of sorted leaf nodes, where each leaf
node is characterized by its interval boundaries and the
points contained inside.
Set i = 0
Set k = 0
Set a = computeLowerBoundGivenLodLevel(m[0],L)
While( i < N ){
    Set b = computeUpperBoundGivenLodLevel(a,L)
    Set j = i
    increment j such that m[j+1] >= b and m[j] < b
    either by binary search or linear incrementation.
    if( j > i ){
        Set l[k] = (a,b,m[i..j])
        Set k = k + 1
    }
    Set i = j+1
    Set a = computeLowerBoundGivenLodLevel(m[i],L)
}
return l Function computeLowerBoundGivenLodLevel()
Input:
- p : morton index
- L : lod level of the leaf node
Output:
- a : lower bound of the interval
Set a to the largest power of two bounding p from below.
return a Function computeUpperBoundGivenLodLevel()
Input:
- a : lower bound of the interval
- L : lod level of the leaf node
Output:
- b : upper bound of the interval
Set c equal to two to the power of L
Set b = a + c
return b
```

Fig. 7

INDEXATION OF MASSIVE POINT CLOUD DATA FOR EFFICIENT VISUALIZATION

CROSS-REFERENCE TO RELATED APPLICATIONS

This application claims priority to European Patent Application No. 18176796.3, filed on Jun. 8, 2018. The foregoing patent application are incorporated herein by reference.

FIELD OF INVENTION

A method for pre-processing point clouds comprising large amounts of point data.

BACKGROUND

The method for pre-processing point clouds including large amounts of point data generally comprises converting the points' coordinates to Morton indices, sorting the Morton indices and determining, based on predefined criteria, intervals by a walk through (sequential scan) of the sorted array of Morton indices. The resulting intervals define the leaf nodes and form the basis and starting point for a subsequent generation of a tree index structure comprising the leaf nodes, nodes, branches and nodes connecting the branches (branch nodes). Point data contained within nodes and/or sub-trees of a node can be quantized, allowing for lossy or lossless compression. The pre-processing thereby enables a subsequent efficient visualization of the point cloud data for example on desktop and mobile devices.

Generally, point clouds, representing data points in space, are produced by 3D scanning devices measuring and collecting three dimensional point information. Such point clouds are used across many technical fields including but not being limited to creating 3D CAD models e.g. in part manufacturing, to metrology and quality control related tasks or to geodesy projects. Thereby, in most cases an efficient visualization of the point cloud is of critical importance.

For example, light detection and ranging (LIDAR) systems represent a special kind of 3D scanning devices which measure space to such a high level of detail that the resultant massive amount of points, the so called point cloud, can appear as a coherent scene in the manner of a pointillist painting. The produced point clouds or sets of echoes are data sets representing points whose position, distance and optionally intensity and colour values are sensed by the system.

Typically, LIDAR systems collect data by transforming raw sensor data into point data that have three position coordinates, x, y, and z. The raw sensor data is expressed in spherical coordinates: a first angle that represents the angle of rotation about a vertical axis, a second angle that represents the angle of rotation about a horizontal axis and a range or distance. The angle coordinates correspond with the LIDAR components that determine the direction of an emitted measurement radiation pulse. These spherical coordinates are then transformed into Cartesian coordinates, which are more convenient for later operations on the data.

After collection, the point cloud data files must usually be processed e.g. spatially indexed and/or compressed for efficient three-dimensional (3D) visualization of the collected data especially in view of using mobile devices for visualization having limited computing resources. Depending on the amount of collected data, several days of computing time can elapse on a desktop computer in order to look at all the data in 3D.

Due to the nowadays very high data collection rates achievable with 3D scanning devices the storage and especially the handling of the immense amount of data is challenging.

As the collection rate can be expected to soar in the near future there is an urgent need for powerful data processing methods enabling an efficient handling of post-processed data e.g. during 3D visualization of point cloud data on desktop and mobile devices.

BRIEF DESCRIPTION

Therefore, it is the object of some embodiments of the present invention to provide an efficient pre-processing method for point clouds comprising large amount of data enabling an efficient handling of post-processed data e.g. during 3D visualization of point cloud data on desktop and mobile devices.

The pre-processing method according to some embodiments of the invention is based on the conversion of point coordinates to Morton indices, the sorting of the Morton indices followed by applying an efficient leaf node generation algorithm which enables to obtain a tree index structure almost instantly. Thereby the leaf node generation is based on a sequential scan (walk through) of the Morton indices with minimal back tracking of the sorted array of Morton indices favourable for input-output operations when reading data for example from disk (out of core treatment). The resulting array of leaf nodes arranged in ascending order allows the computation of the tree index structure branch by branch avoiding any costly recursive algorithm. The as-defined tree index structure has several levels which relate each to a different level of detail (LOD). Thereby the LOD increases from top to the bottom of the tree, starting from the top root node going down to the leaf nodes wherein corresponding branches have nodes and are connected by nodes (branch nodes). In order to allow for efficient visualization respecting the characteristics of modern graphical processing unit (GPU) architectures the nodes of the tree can be quantized. The quantization consists in choosing a subset of the initial set of points lying in the respective node. This quantization can be done efficiently by applying a raster allowing for a compact (compressed) representation of the points in a lossy or lossless manner. The tree index structure enables an efficient query of data of interest depending on a desired LOD during later 3D visualization.

The method is realised by implementing the characterising features of the independent claims. Features that develop the method in an alternative or advantageous manner are described in the dependent patent claims.

According to some embodiments of the invention, the method is used for pre-processing a point cloud in order to provide an index structure being used for manipulating and visualizing a point cloud. The point cloud has a plurality of points with point coordinates and/or, depending on the characteristics of the data recorded by the 3D scanner device, point intensity and/or point colour values. In particular, the point cloud results from a scan with a LIDAR system. The method comprises:

the conversion of the point coordinates of the points making up the point cloud to Morton indices, thereby, the points having point coordinates and related Morton indices, sorting the Morton indices based on a Morton order, determining a first interval comprising a first amount of sorted Morton indices based on predefined criteria, determining a first, in particular exactly one first, leaf node as first leaf node based on the Morton indices or the point coordinates of the points comprised by the first interval, determining a second interval adjacent to the first interval and along the Morton order comprising a second amount of sorted Morton indices based on predefined criteria, determining a second, in particular exactly one second leaf node as second leaf node based on the Morton indices or the point coordinates of the points comprised by the second interval, determining further intervals based on predefined criteria and determining further corresponding leaf nodes based on the sorted Morton indices or the point coordinates of the corresponding points comprised by the further intervals following the Morton order of the sorted Morton indices, wherein, the intervals and corresponding leaf nodes are determined based on sequentially reading the sorted Morton indices along the Morton order wherein an interval and corresponding leaf node is determined based on a previously determined interval, in particular wherein an upper bound of the interval to be determined is outside of a previously determined interval. The determined interval comprises sorted Morton indices not being comprised by the previously determined interval. In contrast to a recursive algorithm a determined interval is, according to the invention, not further subdivided until a predefined criterion is met, instead the further determined intervals are not enclosed by the determined interval. Related to the conversion of the point coordinates the Morton order represents a space filling curve preserving the locality of the points before conversion.

The algorithms used for determining the intervals and consequently the leaf nodes, according to predefined criteria, are based on a sequential scan (walk through) in mostly ascending order of the sorted array of Morton indices resulting in a partition of the sorted array of Morton indices into either intervals (sub-intervals) containing at most a predefined number of points or into intervals with a predefined size based on the predefined LOD on which the leaf nodes are to be determined. Thereby the algorithms are not based on a recursive determination of the intervals/leaf nodes. An important property of the points contained in the sub-intervals (intervals) is that they are contained in a specific region of space corresponding to the leaf nodes of the tree index structure. An example implementation of these algorithms as a means of illustration is given in FIGS. 6 and 7, in FIG. 6 for determining the intervals based on a predefined number of points to be contained in the intervals and in FIG. 7 for determining the intervals based on a predefined LOD on which the leaf nodes and therefore the intervals have to be determined.

a.) Leaf Node Determination Based on Predefined Number of Points

The algorithm describes an interval being delimited by two Morton indices a and b which contain an array of the sorted Morton indices. The walk through (sequential scan) the sorted array of Morton indices consists in testing whether the corresponding interval contains more or less points than a predefined number of points. Only in case it contains more points the interval is amended (partitioned), wherein a new bound b is computed, such that the resulting determined interval (sub-interval) defined by a and the new bound b contains less than the predefined number of points. The bounds of the next interval are then given by setting a equal to the previously computed b and computing a new value b for the next interval (sub-interval) and continuing the sequential scan (walk through). An important ingredient in the algorithm is the computation of the bound b which must respect the properties of the tree index structure. In the present example using Morton indices this is done efficiently by employing bitwise "exclusive or" and bitwise "or" operators on the Morton indices and subsequently finding the smallest factor of two or a lower bound being a power of two. In two or three dimensions it can be advantageous instead to choose a power of four or eight, respectively.

Upon completion, the as-derived intervals, being intervals (sub-intervals) containing less than the predefined number of points, define an array of leaf nodes, wherein each leaf node is defined based on the Morton indices contained in the corresponding interval. Said leaf nodes, as a consequence of the present algorithm are sorted in ascending order along the Morton order.

b.) Leaf Node Determination Based on Predefined LOD

Upon completion, the as-derived intervals, being intervals (sub-intervals) present on the predefined LOD, define an array of leaf nodes, wherein each leaf node is defined based on the Morton indices contained in the corresponding interval. Said leaf nodes, as a consequence of the present algorithm are sorted in ascending order along the Morton order.

Figure 6:
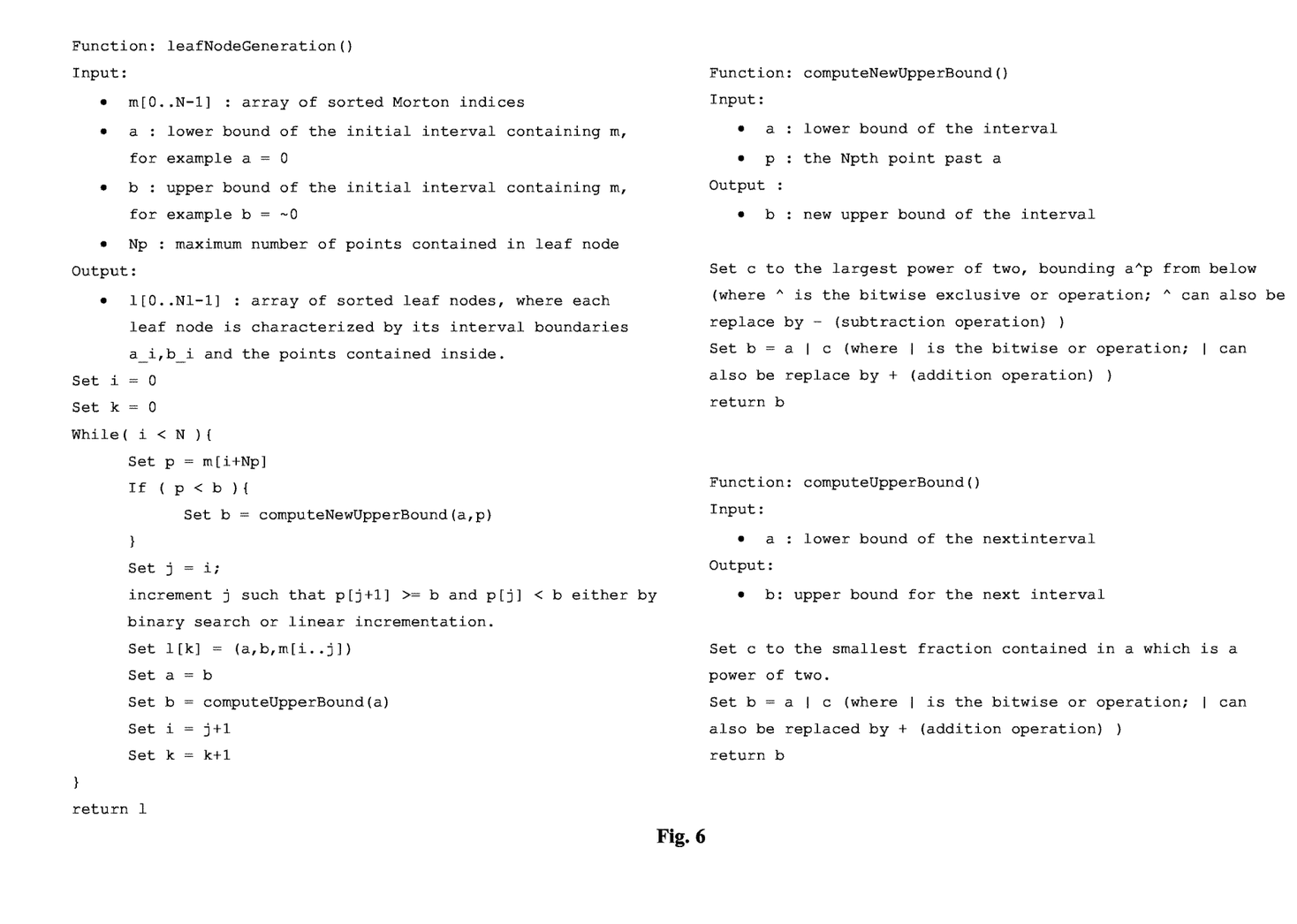
FIG. 6 illustration of example implementation of an algorithm according to a predefined criterion (predefined number of points)
Figure 7:
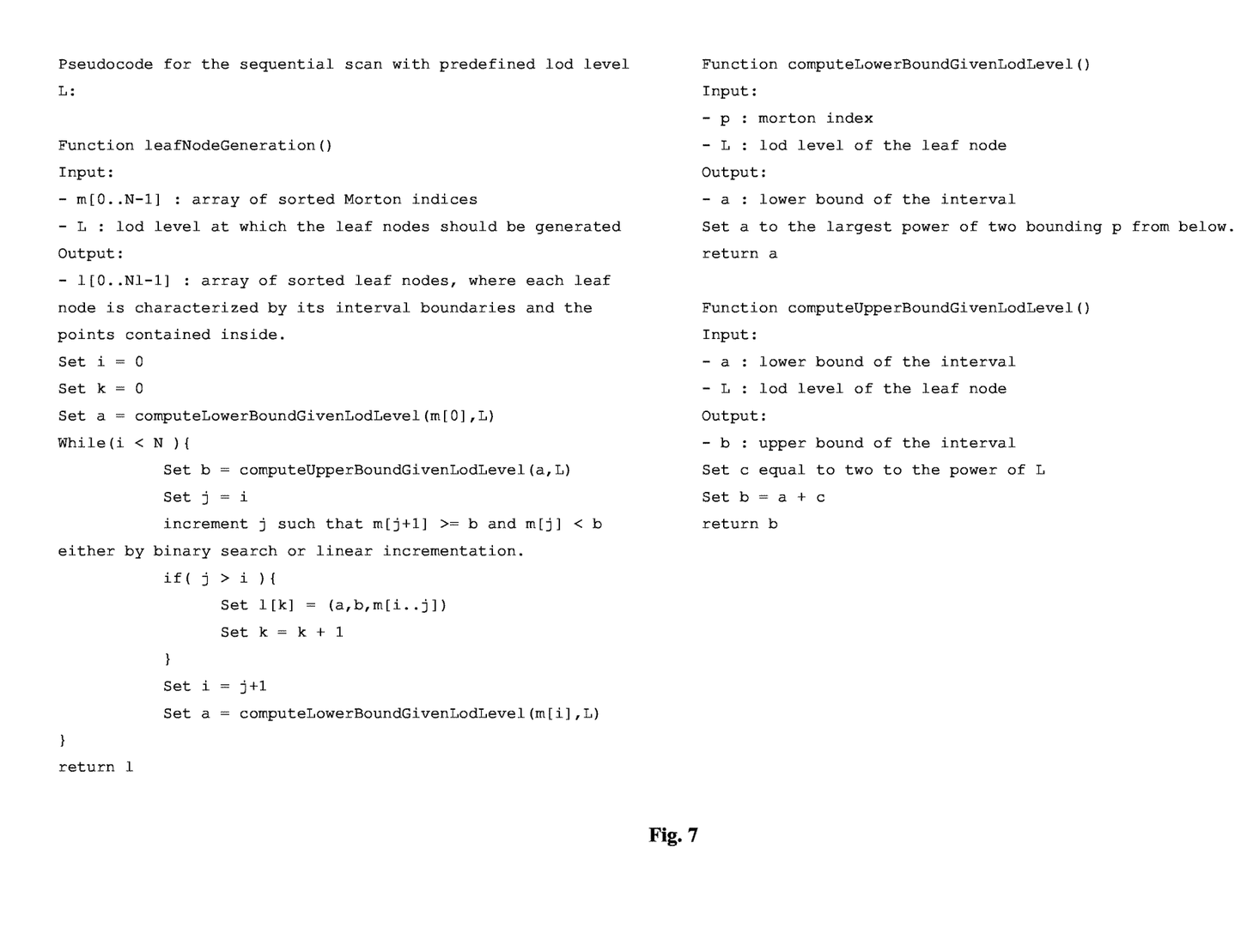
FIG. 7 illustration of example implementation of an algorithm according to a predefined criterion (LOD).

The pseudo codes shown in FIGS. 6 and 7 only serve the purpose of presenting possible implementations of a corresponding algorithm and are not be understood as a limitation to the disclosure.

In a further embodiment, a tree index structure comprising:
  nodes comprising points,
  branches comprising at least two nodes of any kind,
  branch nodes which connect the branches, and
  leaf nodes,
is generated, starting from the determined leaf nodes and along with the leaf node determination.

Further, according to another embodiment, the tree index structure is generated from the determined leaf nodes by determining a branch node from a determined leaf node to a previously determined leaf node and deriving therefrom the nodes and the branches of the tree index structure and, thereby, the tree index structure.

For example, the tree structure comprising leaf nodes, nodes, branches and nodes which connect the branches (branch nodes) is generated by starting at e.g. the first leaf node and scanning sequentially along the above obtained leaf node array determining the node which connects the branch which is terminated by the second leaf node to the branch terminated by the first leaf node, generating a new branch starting from the branch point and adding it to the tree structure. This procedure is repeated incrementally along the whole leaf node array until a tree structure is generated connecting a top root node over nodes and corresponding branches to all the terminal leaf nodes. Thereby nodes connecting branches of subsequent leaf nodes can be determined by using bitwise "exclusive-or" operator, bitwise "or" operator or integer "addition" and "subtraction" operator on the Morton indices defining the leaf nodes. The tree structure can also be referred to as level of detail tree (LOD tree).

According to some embodiments, the predefined criteria based on which the intervals and leaf nodes are determined are either:
- a predefined number of points being comprised by the intervals,
- a predefined level of detail (LOD) defining a size of the intervals, or
- a combination of both, wherein, the predefined criteria are the same for all intervals or it is decided for each interval which of the predefined criteria are applied.

According to a further embodiment, each interval comprises a lower bound and an upper bound wherein the lower bound of an interval corresponds to the upper bound of an adjacent preceding interval and the upper bound of an interval corresponds to the lower bound of an adjacent subsequent interval, wherein, in the course of determining the intervals,
- based on the predefined number of points, the corresponding upper bound is determined based on a binary search of the sorted Morton indices or on a linear walk through (by linear incrementation) the sorted Morton indices, and the corresponding lower bound is determined based on the upper bound of an adjacent preceding interval, or
- based on the predefined LOD, corresponding sorted Morton indices comprised by the intervals are determined based on a binary search of the sorted Morton indices or on a linear walk through (by linear incrementation) the sorted Morton indices.

According to a further embodiment, the leaf nodes are determined based on the Morton indices by determining a last Morton index comprised within a corresponding interval and said last Morton index defines the corresponding leaf node.

According to another embodiment, the leaf nodes are determined based on the corresponding point coordinates using a bitwise "or" operator.

According to an advantageous embodiment the above algorithm consists in dividing up the space containing the point cloud into well-defined regions of space, called processing buckets, which correspond to the nodes of the tree structure on a given level of detail. For each bucket the above algorithm can be applied to generate a sub-tree for the processing bucket since the point data within a processing bucket does not have data dependencies on data within another processing bucket. Scattering the point data onto different processing buckets is effected right after conversion of the point coordinates to Morton indices. Therefore, the tree index structure generation and an optional quantization can be conducted in parallel for all the processing buckets. This approach has also advantages for processing the point cloud while the 3D scanning, in particular the LIDAR scanning process is still ongoing and the full spatial extent of the point cloud is not known from beforehand. Therefore, according to the invention the points of the point cloud are scattered onto processing buckets such that the points within a processing bucket can be pre-processed in parallel to points within another processing bucket.

In a further embodiment, the predefined number of points or the predefined LOD is depending on a characteristic of the point cloud or provided by user input or by a 3D scanning device generating the point cloud, in particular a LIDAR system and can be varied during the sequential scan of the sorted array of Morton indices. Thereby the total number of points or the size of the scanned volume can be a characteristic of the point cloud from which the predefined number of points or the LOD is automatically calculated. Further depending on whether the visualization will be displayed on a mobile device or a desktop device can be indicated by user input resulting in the automatic determination of the predefined number of points or of the LOD. Therefore, in an advantageous embodiment of the invention, the predefined number of points or the predefined LOD is
- depending on a characteristic of the point cloud, or
- provided by user input, or
- provided by a 3D scanning device generating the point cloud in particular a light detection and ranging (LIDAR) system, and can be varied during the determination of the first, second and further intervals.

A quantization of point data of points within a node and/or a sub-tree of a node is possible and most efficient by breadth first traversal analysis of the tree index structure starting at the deepest leaf nodes. However, depending on the situation (for example when employing a parallel architecture) a split into sub-trees which are traversed top down or bottom up might also be applicable. The quantization consists in selecting a subset of the points contained in the node by means of a raster. Therefore, a bit mask is employed on the according Morton indices resulting in quantized positions of point data inside the corresponding tree node and/or a sub-tree of a node. The quantization by means of a raster allows for a lossy compression by saving only the index of the raster vertex (or equivalently only the top bits of the point) or for a lossless compression when in addition the point coordinate information of the actual position with reference to the closest raster vertex is saved. Thereby a maximum allowed distance can enter as a parameter into the quantization process determining whether a raster vertex is occupied or not. So, a vertex of the either regular or random raster is said to be empty or occupied depending on whether a point of the point cloud is lying in its vicinity. This is advantageous when considering, for example, streaming data over the internet, as the receiving client is only told which vertex of the raster in question is occupied instead of transmitting the full point coordinate information, resulting in a lossy transmission of point data. When lossless transmission is required the point coordinate information with reference to the corresponding raster vertex is transmitted in addition. As the point is lying close to the raster point less storage is required to transmit the point coordinate information with reference to the corresponding raster vertex. In case of lossy transmission and the use of a regular raster, some randomness can be added on the client side to avoid aliasing effects.

Therefore, according to a further advantageous embodiment, point data contained within a node and/or a sub-tree of a node is quantized. Quantizing points comprised within nodes and/or sub-trees of a node comprises:
- randomly choosing a sub-set of points out of the points comprised within a node or sub-tree of a node, wherein the points of the sub-set represent quantized points, or
- employing either a regular or random raster on the points wherein the raster comprises vertices and wherein a vertex of said vertices is said to be empty or occupied depending on whether a point of the points is lying in its vicinity or not and wherein the occupied vertices represent quantized points.

In a further embodiment, a raster is employed on the points by employing a bit mask or by using a bit shift to the right operator on the sorted Morton indices of the points.

According to a further embodiment, branch nodes between subsequent leaf nodes are determined by using bitwise "exclusive-or" operator on the Morton indices determining the leaf nodes.

According to some embodiments, the point cloud is based on a scan with a 3D scan device, in particular with a LIDAR system.

According to an alternative embodiment, converting point coordinates and ordering converted point coordinates is based on any space filling curve preserving locality, in particular based on the Hilbert curve or Peano curve.

Further according to some aspects of the invention, a non-transitory computer program product, comprising program code which is stored on a machine-readable medium, and having computer-executable instructions causes, when executed, a computer to perform the pre-processing method according to any of the preceding embodiments.

In a further embodiment an array of the sorted Morton indices is divided at specific Morton indices into subsets and further pre-processing according to any of the preceding embodiments is performed on said subsets in parallel.

According to a further embodiment the points of the point cloud have additional point specific data, besides point coordinates and Morton indices, based on which the intervals and corresponding leaf nodes are determined after conversion and sorting.

BRIEF DESCRIPTION OF THE DRAWINGS

The inventive method is described below in more detail purely by way of example with the aid of concrete exemplary embodiments illustrated schematically in the drawings. In detail.

DETAILED DESCRIPTION

Figure 1:
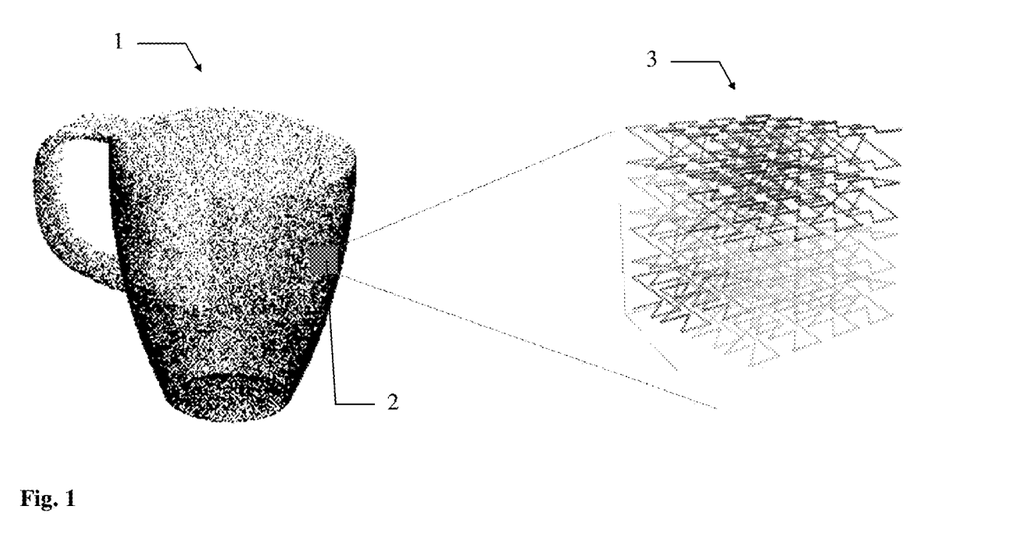
FIG. 1 shows a point cloud representation of a 3D object composed of a plurality of points and accordingly ordered Morton indices.

FIG. 1 shows a point cloud representation of a 3D object as it could result from scanning with a LIDAR system. The point cloud 1 is composed of a plurality of points. The points are stored with their corresponding x, y and z coordinates and depending on the LIDAR system used also with associated intensity and colour e.g. RGB values. As schematically illustrated the point density varies throughout the object. The square area in the point cloud illustrates a processing bucket 2. The point data contained within the processing bucket do not show any data dependency to surrounding point data. Therefore, the point data within the processing bucket can be processed by the method according to the invention in parallel to point data contained within a plurality of other processing buckets (not shown in FIG. 1). According to the invention the point coordinates of the corresponding points are then converted to Morton indices by bitwise interleaving of the binary coordinate values. Here also further information e.g. intensity values or colour information can be contained in the binary representation of the point data. The Morton indices are sorted in ascending order which is graphically illustrated in the case of 3D point data by connecting the points following the space filling Morton curve 3. As LIDAR data result from scanning surfaces points in close proximity to each other usually result in a more two dimensional representation than schematically indicated in FIG. 1.

Figure 2:
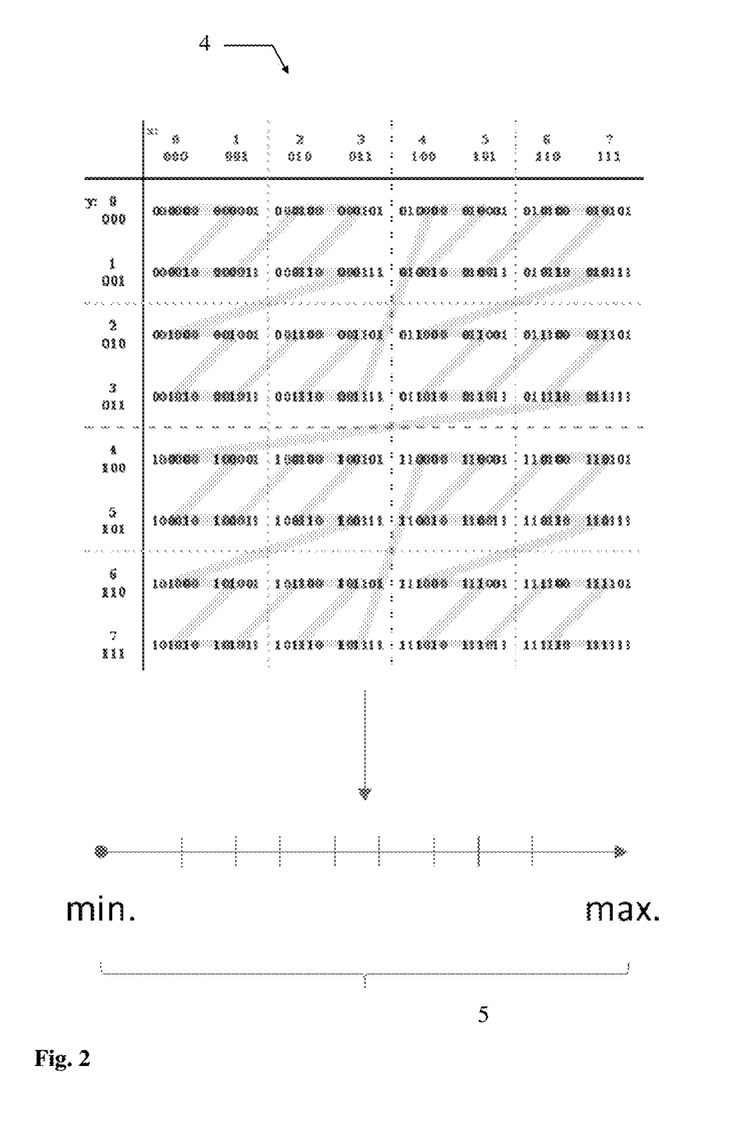
FIG. 2 shows an example of the conversion of two-dimensional coordinates into Morton indices and according ordering of the Morton indices spanning an indices range.

FIG. 2 illustrates for the sake of simplicity a Morton indices array 4 resulting from the conversion of two-dimensional integer coordinate values. The two-dimensional representation of the ordering according to the Morton order is illustrated by the connecting line. The as-sorted Morton indices span a range 5 from a minimum value to a maximum value. Based on these extremities an initial starting interval for the iteration during which the intervals and leaf nodes are determined can be derived.

Figure 3:
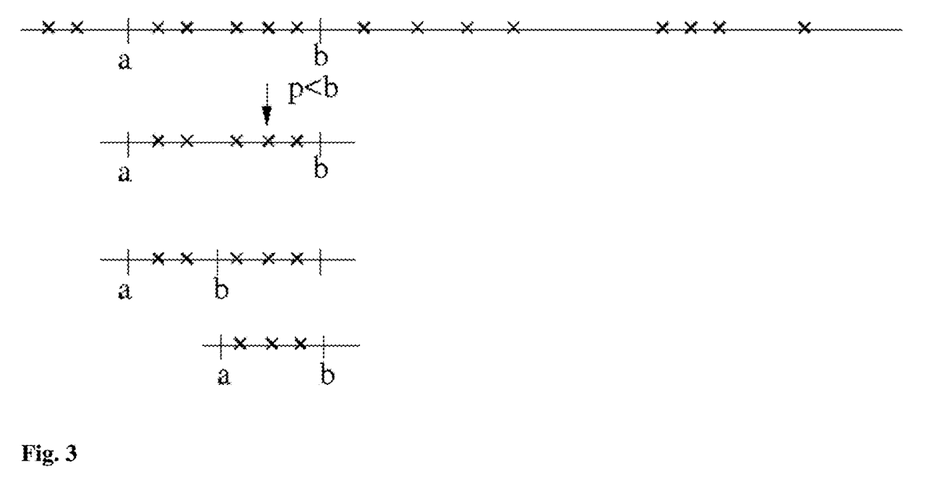
FIG. 3 sketches the leaf node generation algorithm.

FIG. 3 is an illustration of the above leaf node generation algorithm, where the maximum predefined number of points in the leaf node is set to 3. The crosses on the line represent the sorted Morton indices. For a given initial interval with bounds a and b, we check whether the fourth point counting from a is included in the interval or not. If so we compute a new upper bound b replacing the initial bound b. This defines the interval and corresponding leaf node and we set the lower bound a of the next interval to b and compute an upper bound for the next interval.

Figure 4:
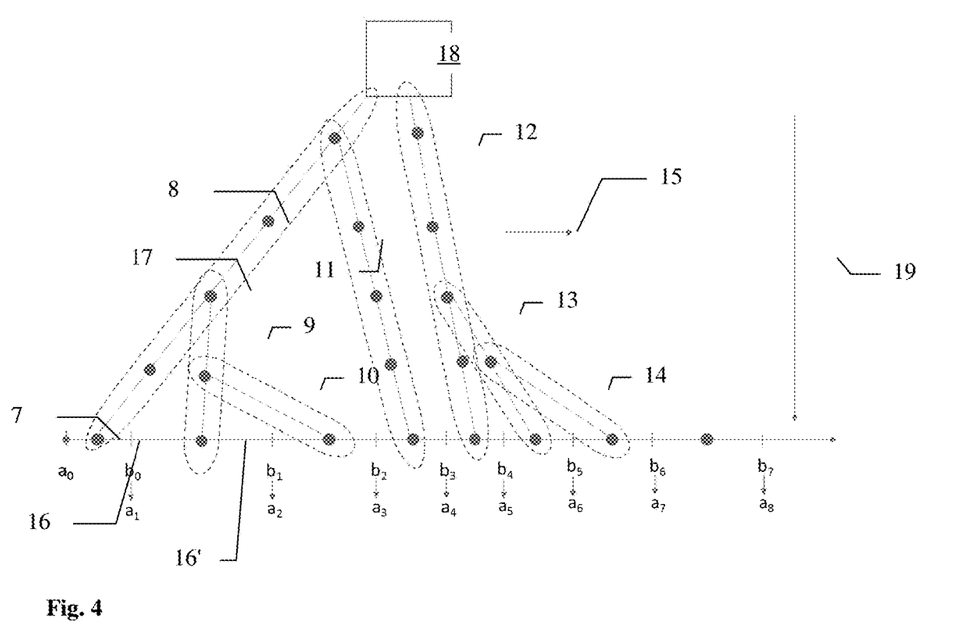
FIG. 4 sketches the tree generation algorithm based on the leaf node array computed beforehand.

FIG. 4 sketches the tree generation algorithm. By means of a subsequent traversal of the previously computed leaf node array 7, the tree structure is built branch by branch 8, 9, 10, 11, 12, 13, 14 from left to right in the direction of tree generation 15. For a given leaf node 16 the branch node 17 (node connecting the branches) on the previous branch is identified analysing the lower bound of the leaf node interval, then the new branch is generated bottom up. This procedure is repeated incrementally along the whole leaf node array 7 until a tree structure is generated connecting the top root node 18 over nodes and corresponding branches to all the terminal leaf nodes. The tree structure is referred to as level of detail tree (LOD tree). Thereby the level of detail increases from top to the bottom of the tree 19, starting from the top root node down to the leaf nodes wherein corresponding branches are connected by nodes 17 (branch nodes).

Figure 5:
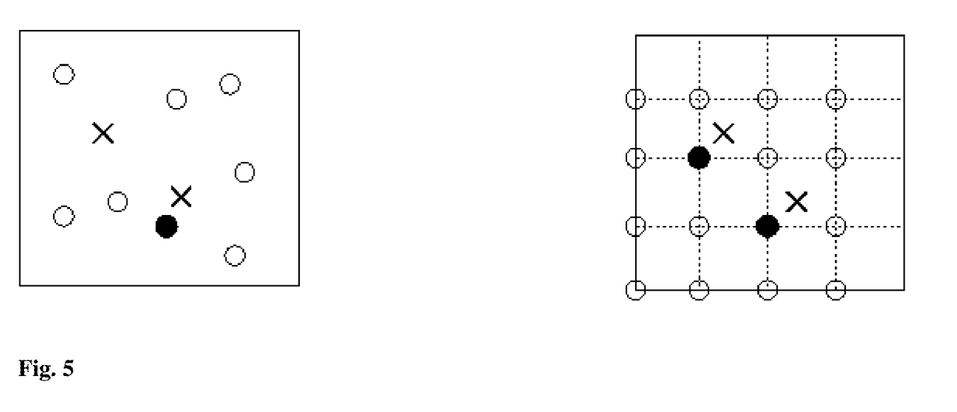
FIG. 5 sketches the quantization procedure using a random or regular raster.

FIG. 5 sketches the quantization procedure of the nodes by means of a raster. Either a random raster (left figure) or a regular raster (right figure). For each raster vertex (circle symbol) it is determined whether a point (cross symbol) of the point cloud is in its vicinity or not. If so, the raster point is marked as occupied.

Although the invention is illustrated above, partly with reference to some preferred embodiments, it must be understood that numerous modifications and combinations of different features of the embodiments can be made. All of these modifications lie within the scope of the appended claims.

It goes without saying that these figures illustrated are merely schematics of possible exemplary embodiments.

The invention claimed is:

1. A point cloud pre-processing method for providing an index structure being used for visualizing a point cloud having a plurality of points with point coordinates, the method comprising:

converting the point coordinates to Morton indices such that the points have point coordinates and related Morton indices;

sorting the Morton indices based on a Morton order;

determining a first interval comprising a first amount of sorted Morton indices based on predefined criteria;

determining a first leaf node based on the Morton indices or the point coordinates of the points comprised by the first interval;

determining a second interval adjacent to the first interval and along the Morton order comprising a second amount of sorted Morton indices based on predefined criteria;

determining a second leaf node based on the Morton indices or the point coordinates of the points comprised by the second interval; and determining further intervals based on predefined criteria and determining further corresponding leaf nodes based on the sorted Morton indices or the point coordinates of the corresponding points comprised by the further intervals following the Morton order of the sorted Morton indices, wherein:

the intervals and corresponding leaf nodes are determined based on sequentially reading the sorted Morton indices along the Morton order, an interval and corresponding leaf node is determined based on a previously determined interval, and an upper bound of the interval to be determined is outside of a previously determined interval.

2. The method according to claim 1, wherein a tree index structure comprising:

nodes comprising points, branches comprising at least two nodes of any kind, branch nodes which connect the branches, and leaf nodes, is generated, starting from the determined leaf nodes and along with the leaf node determination.

3. The method according to claim 2, wherein the tree index structure is generated from the determined leaf nodes by determining a branch node from a determined leaf node to a previously determined leaf node and deriving therefrom the nodes and the branches of the tree index structure and, thereby, the tree index structure.

4. The method according to claim 1, wherein the predefined criteria being either:

a predefined number of points being comprised by the intervals, a predefined level of detail (LOD) defining a size of the intervals, or a combination of both, wherein, the predefined criteria are the same for all intervals or it is decided for each interval which of the predefined criteria are applied.

5. The method according to claim 4, wherein each interval comprises a lower bound and an upper bound, wherein in the course of determining the intervals, based on the predefined number of points, the corresponding upper bound is determined based on a binary search of the sorted Morton indices or on a linear walk through, and the corresponding lower bound is determined based on the upper bound of an adjacent preceding interval, or based on the predefined LOD, corresponding sorted Morton indices comprised by the intervals are determined based on a binary search of the sorted Morton indices or on a linear walk through of the sorted Morton indices.

6. The method according to claim 1, wherein the leaf nodes are determined based on the Morton indices by determining a last Morton index comprised within a corresponding interval and said last Morton index defines the corresponding leaf node.

7. The method according to claim 1, wherein the leaf nodes are determined based on the corresponding point coordinates using a bitwise or operator.

8. The method according to claim 1, wherein the points of the point cloud are scattered onto processing buckets such that the points within a processing bucket can be pre-processed in parallel to points within another processing bucket.

9. The method according to claim 1, wherein the predefined criteria are:

depending on a characteristic of the point cloud, or provided by user input, or provided by a 3D scanning device generating the point cloud in particular a light detection and ranging (LIDAR) system, and can be varied during the determination of the first, second and further intervals.

10. The method according to claim 2, the method further comprising quantizing points comprised within nodes or sub-trees of a node by randomly choosing a sub-set of points out of the points comprised within a node or sub-tree of a node, wherein the points of the sub-set represent quantized points, or employing either a regular or random raster on the points wherein the raster comprises vertices and wherein a vertex of said vertices is said to be empty or occupied depending on whether a point of the points is lying in its vicinity or not and wherein the occupied vertices represent quantized points.

11. The method according to claim 10, wherein a raster is employed on the points by employing a bit mask or by using a bit shift to the right operator on the sorted Morton indices of the points.

12. The method according to claim 3, wherein branch nodes between subsequent leaf nodes are determined by using bitwise exclusive-or operator on the Morton indices determining the leaf nodes.

13. The method according to claim 1, wherein the point cloud is based on a scan with a LIDAR system.

14. The method according to claim 1, further comprising converting point coordinates and ordering converted point coordinates according to any space filling curve preserving locality.

15. A non-transitory machine-readable medium having stored thereon a computer program comprising computer-executable instructions, which when executed by a computer cause the computer to perform the method according to claim 1.

16. The method according to claim 1, wherein an array of the sorted Morton indices is divided at specific Morton indices into subsets and wherein further pre-processing is performed on said subsets in parallel.

17. The method according to claim 1, wherein the points of the point cloud further have additional point specific data based on which the leaf nodes are determined after conversion and sorting.

18. The method according to claim 1, further comprising:

generating the index structure; and visualizing the point cloud having the plurality of points with point coordinates from the index structure.

19. The method according to claim 18, further comprising:
generating the index structure from the first leaf node, second leaf node, and further corresponding leaf nodes.

* * * * *